US008381106B2

(12) United States Patent
Bauer et al.

(10) Patent No.: US 8,381,106 B2
(45) Date of Patent: Feb. 19, 2013

(54) TOUCH GESTURE FOR DETAILED DISPLAY (75) Inventors: German Wolfgang Bauer, San Jose, CA (US); Michael K. Chan, Redwood City, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/020,570

(22) Filed: Feb. 3, 2011

(65) Prior Publication Data
US 2012/0204123 A1 Aug. 9, 2012

(51) Int. Cl.
G06F 3/00 (2006.01)
G06F 3/048 (2006.01)

(52) U.S. Cl. ........ 715/722; 715/753; 715/764; 715/768; 715/779; 715/781

(58) Field of Classification Search .................. 715/722, 715/753, 764, 768, 779, 781
See application file for complete search history.

(56) References Cited

U.S. PATENT DOCUMENTS

| | | | |
|---|---|---|---|
| 5,023,851 A | | 6/1991 | Murray et al. |
| 5,528,745 A | | 6/1996 | King et al. |
| 5,936,625 A | * | 8/1999 | Kahl et al. ..................... 715/775 |
| 5,970,466 A | | 10/1999 | Detjen et al. |
| 6,034,683 A | * | 3/2000 | Mansour et al. .............. 715/764 |
| 6,323,883 B1 | | 11/2001 | Minoura et al. |
| 6,522,347 B1 | | 2/2003 | Tsuji et al. |
| 6,597,378 B1 | * | 7/2003 | Shiraishi et al. ............... 715/764 |
| 6,661,438 B1 | * | 12/2003 | Shiraishi et al. ............... 715/835 |
| 6,809,724 B1 | * | 10/2004 | Shiraishi et al. ............... 345/169 |
| 7,072,295 B1 | | 7/2006 | Benson et al. |
| 7,301,529 B2 | | 11/2007 | Mavit et al. |
| 7,349,920 B1 | | 3/2008 | Feinberg et al. |
| 7,356,563 B1 | | 4/2008 | Leichtling et al. |
| 7,392,041 B2 | * | 6/2008 | Brush et al. ................. 455/414.1 |
| 7,479,949 B2 | | 1/2009 | Jobs et al. |
| 7,487,458 B2 | * | 2/2009 | Jalon et al. ..................... 715/765 |
| 7,546,318 B2 | | 6/2009 | Bates |
| 7,668,775 B2 | * | 2/2010 | Lu .................................. 705/37 |
| 7,949,642 B2 | | 5/2011 | Yang et al. |
| 8,004,541 B2 | * | 8/2011 | Mercer et al. ................. 345/646 |
| 8,015,500 B2 | * | 9/2011 | Mita .............................. 715/781 |
| 2005/0039142 A1 | * | 2/2005 | Jalon et al. ..................... 715/823 |
| 2005/0213717 A1 | * | 9/2005 | O'Neil et al. .............. 379/88.11 |

(Continued)

OTHER PUBLICATIONS

Calengoo Tutorial, Stig Brautaset, 2009, http://calengoo.dgunia.de/Tutorial.html, 6 pages.*

(Continued)

Primary Examiner — Doon Chow
Assistant Examiner — Linh K Pham
(74) Attorney, Agent, or Firm — Shumaker & Sieffert, P.A.

(57) ABSTRACT

In general, the present disclosure is directed to techniques for displaying, e.g., events of multiple calendars or annotations in a word processor in a single view. In one example, a method includes, providing a first calendar and a second calendar, wherein the first calendar includes a first group of calendar events at least some of which have corresponding textual event details, and wherein the second calendar includes a second group of calendar events at least some of which have corresponding textual event details; receiving a user input to select one of the first calendar or the second calendar; displaying the one or more corresponding textual event details of the first group of calendar events for the first calendar; and displaying visual representations of the second group of calendar events for the second calendar without displaying the corresponding textual event details.

28 Claims, 8 Drawing Sheets

U.S. PATENT DOCUMENTS

| | | | | |
|---|---|---|---|---|
| 2006/0101350 | A1* | 5/2006 | Scott | 715/779 |
| 2007/0118795 | A1 | 5/2007 | Noyes et al. | |
| 2007/0198950 | A1 | 8/2007 | Dodge et al. | |
| 2008/0165151 | A1 | 7/2008 | Lemay et al. | |
| 2008/0307323 | A1* | 12/2008 | Coffman et al. | 715/753 |
| 2009/0040875 | A1 | 2/2009 | Buzescu et al. | |
| 2009/0113478 | A1 | 4/2009 | Haughawout et al. | |
| 2009/0158200 | A1* | 6/2009 | Palahnuk et al. | 715/781 |
| 2009/0174680 | A1 | 7/2009 | Anzures et al. | |
| 2009/0178008 | A1 | 7/2009 | Herz et al. | |
| 2009/0179867 | A1 | 7/2009 | Shim et al. | |
| 2009/0189915 | A1 | 7/2009 | Mercer et al. | |
| 2009/0217201 | A1 | 8/2009 | Bocking et al. | |
| 2009/0228322 | A1* | 9/2009 | van Os et al. | 705/9 |
| 2010/0079498 | A1 | 4/2010 | Zaman et al. | |
| 2010/0099462 | A1 | 4/2010 | Baek et al. | |
| 2010/0122190 | A1* | 5/2010 | Lu | 715/764 |
| 2010/0162105 | A1 | 6/2010 | Beebe et al. | |
| 2011/0078612 | A1* | 3/2011 | Matsuzawa et al. | 715/772 |
| 2011/0078622 | A1 | 3/2011 | Missig et al. | |
| 2011/0143769 | A1 | 6/2011 | Jones et al. | |
| 2011/0167369 | A1 | 7/2011 | Van Os | |
| 2011/0167382 | A1 | 7/2011 | Van Os | |
| 2011/0239146 | A1* | 9/2011 | Dutta et al. | 715/768 |
| 2011/0254792 | A1 | 10/2011 | Waters et al. | |
| 2011/0295641 | A1* | 12/2011 | Guiheneuf et al. | 705/7.19 |
| 2012/0204123 | A1 | 8/2012 | Bauer et al. | |

OTHER PUBLICATIONS

Microsof Outlook 2010 Product Guide, Microsoft® Outlook® 2010, 6 pages.*

Chapter 5, J1939.c CAN Bus plus RS232 "Address Claiming" simulation with Vector's CANoe, [online] Recursos (Mar. 29, 2006). Retrieved from the Internet: <URL: http://recursos3.planetaclix.pt/canuart/index_5.html> (9 pg.).

2.7. MultiUser Calendar [online] Zarafa Collaboration Platform, The User Manual, Edition 2.0 (2011) (First retrieved on Oct. 14, 2010) (Retrieved from the Internet: <URL: http://doc.zarafa.com/6.40/User_Manual/en-US/html/_multi_user_calendar.html> (7 pgs.).

Thyme User Manual v1.3 [online]. eXtrovert software (2006). Retrieved from the Internet: <URL: http://www.thymenews.com/products/thyme/thyme-guide-1.3.pdf> (121 pgs.).

Schedule a Meeting Applies to: Microsoft Office Outlook 2007. Support/Outlook/Outlook 2007 Help and How-to Datasheet [online]. Microsoft Corporation (2011). Retrieved from the Internet: <URL: http://office.microsoft.com/en-us/sharepoint-server-help/schedule-events-and-milestones-with-a-calendar-HA101729898.aspx> (7 pgs.).

Office Action from U.S. Appl. No. 13/250,845, dated Nov. 14, 2011, 27 pp.

Response to Office Action dated Nov. 14, 2011, from U.S. Appl. No. 13/250,845, filed Feb. 14, 2012, 20 pp.

CalenGoo Tutorial, Stig Brautaset, 2009, http://calengoo.dgunia.de/Tutorial.html, 6 pp. (Cited by examiner in Office Action from U.S. Appl. No. 13/250,845, dated Jul. 9, 2012).

Notice of Allowance from U.S. Appl. No. 13/250,845, dated Jul. 9, 2012, 11 pp.

International Search Report and Written Opinion of international application No. PCT/US2012/022603, dated Aug. 24, 2012, 8 pp.

Microsoft Outlook 2010 Product Guide, "Microsoft® Outlook® 2010: An Overview," 6 pages, (Cited by examiner in Office Action from U.S. Appl. No. 13/250,845, dated Jul. 9, 2012).

CalenGoo Tutorial, http://calengoo.dgunia.de/Tutorial.html, accessed on Aug. 7, 2012, 6 pp.

Neustaeder et al., "The calendar is Crucial: Coordination and Awareness through the Family Calendar," ACM Transactions on Computer Human Interaction, vol. 16, No. 1, Article 6, Publication date: Apr. 2009, 48 pp.

Neustaeder et al., "A digital Family Calendar in the Home: Lessons from Field Trials of LINC, 2007 i.s Crucial: Coordination and Awareness through the Family Calendar," 2009, pp. 199-206.

CalenGoo Tutorial. MacWorld.com [online]. Datasheet [First Accessed on Aug. 20, 2010]. Retrieved from the Internet: <URL:http://calengoo.dgunia.de/Tutorial.html> (6 pgs.).

Jeni's Musings, The future of computer interfaces. Blog [Posted on Apr. 28, 2007]. Retrieved from the Internet: <URL:www.jenitennison.com/blog.node/7/> (2 pgs.).

"Cynergy & Kevin Lynch Demo First Multi-Touch AIR App at MAX 2009," CynergyBlogs [Monday Oct. 5, 2009]. Retrieved from the Internet: <URL:http://cynergysystems.com/blogs/page/davewolf?entry=cynergy kevin lynch demo first> (4 pgs total.).

Apple Accessibility—Iphone—Vision, Datasheet [online] (First accessed on Aug. 20, 2010], retrieved from the internet: http://www.apple.com/accessibility/iphone/vision.html, 5 pp.

CalenGoo, "(Sync with Google Calendar Trademark) review, MacWorld.com," reviewed Dec. 17, 2009, retrieved from http://www.macworld.com/appguide/app.html?id=64900&expand=false, 1 p.

"Cynergy MultiTouch Calendar for AIR 2.0," The Computus Engine, Posted on Oct. 30, 2009, retrieved from the internet: http://www.computus.org/journal/?p=2346, 4 pp.

Audio Kit—New iPhone App from Sinusoid, Posted on Jun. 18, 2010, retrieved from the internet: http://dev.sinusoid.com/articles/2010/06/18/audio-kit-new-iphone-app-from-sinusoid, 2 pp.

"Smule goes Boom with new Sonic Boom iPhone app," Whataboutmac.com, Posted Oct. 21, 2008, retrieved from the internet: http://www.whataboutmac.com/index.php/2008/10/21/smule-go-boom-with-new-sonic-boom-iphone-app/, 6 pp.

U.S. Appl. No. 12/959,574 by Michael K. Chan, filed Dec. 3, 2010.
U.S. Appl. No. 13/250,801, by Michael K. Chan, filed Sep. 30, 2011.
U.S. Appl. No. 13/610,568, by German Wolfgang Bauer, filed Sep. 11, 2012.

* cited by examiner

TOUCH GESTURE FOR DETAILED DISPLAY

TECHNICAL FIELD

This disclosure relates to graphical user interfaces.

BACKGROUND

A user may interact with applications executing on a computing device (e.g., mobile phone, tablet computer, smart phone, or the like). For instance, a user may install, view, or delete an application on a computing device.

In some instances, a user may interact with a calendar application executing on a computing device. A user may view a time, day, or event in a calendar application. A user may also change events in a calendar application. A user may, in some instances, interact with a calendar application on a computing device using buttons or a touch-screen.

SUMMARY

In one example, a method includes, providing a first calendar and a second calendar during execution of a module on a computing device, wherein the first calendar includes a first group of calendar events at least some of which have one or more corresponding textual event details, and wherein the second calendar includes a second group of calendar events at elast some of which have one or more corresponding textual event details; receiving a user input to select one of the first calendar or the second calendar; upon receiving the user input, displaying the one or more corresponding textual event details of the first group of calendar events for the first calendar; and upon receiving the user input, displaying visual representations of the second group of calendar events for the second calendar without displaying the one or more corresponding textual event details of the second group of calendar events.

In one example, a computer-readable storage medium is encoded with instructions that when executed cause one or more processors of a computing device to perform operations including: providing a first calendar and a second calendar during execution of a module, wherein the first calendar includes a first group of calendar events at least some of which have one or more corresponding textual event details, and wherein the second calendar includes a second group of calendar events at least some of which have one or more corresponding textual event details; receiving a user input to select one of the first calendar or the second calendar; upon receiving the user input, displaying the one or more corresponding textual event details of the first group of calendar events for the first calendar; and upon receiving the user input, displaying visual representations of the second group of calendar events for the second calendar without displaying the one or more corresponding textual event details of the second group of calendar events.

In one example, a computing device includes one or more processors; an output device; a calendar application installed on the computing device and operable by the one or more processors to display at the output device a first calendar and a second calendar during execution of the calendar application, wherein the first calendar includes a first group of calendar events at least some of which have one or more corresponding textual event details, and wherein the second calendar includes a second group of calendar events at least some of which have one or more corresponding textual event details; an input device to receive a user input to select one of the first calendar or the second calendar; and means for displaying the one or more corresponding textual event details of the first group of calendar events for the first calendar and visual representations of the second group of calendar events for the second calendar without displaying the one or more corresponding textual event details of the second group of calendar events.

In one example, a method includes providing a first annotation group and a second annotation group during execution of a module on a computing device, wherein the first annotation group includes annotations at least some of which have one or more corresponding textual annotation details, and wherein the second annotation group includes annotations at least some of which have one or more corresponding textual annotation details; receiving a user input to select one of the first annotation group or the second annotation group; upon receiving the user input, displaying the one or more corresponding textual annotation details of the annotations for the first annotation group; and upon receiving the user input, displaying visual representations of the annotations for the second annotation group without displaying the one or more corresponding textual annotation details of the annotations of the second annotation group.

In one example, a computer-readable storage medium is encoded with instructions that when executed cause one or more processors of a computing device to perform operations including: providing a first annotation group and a second annotation group during execution of a module, wherein the first annotation group includes annotations at least some of which have one or more corresponding textual annotation details, and wherein the second annotation group includes annotations at least some of which have one or more corresponding textual annotation details; receiving a user input to select one of the first annotation group or the second annotation group; upon receiving the user input, displaying the one or more corresponding textual annotation details of the annotations for the first annotation group; and upon receiving the user input, displaying visual representations of the annotations for the second annotation group without displaying the one or more corresponding textual annotation details of the annotations of the second annotation group.

In one example, a computing device includes: one or more processors; an output device; an application installed on the computing device and operable by the one or more processors to display at the output device a first annotation group and a second annotation group during execution of the application, wherein the first annotation group includes a first group of annotations at least some of which have one or more corresponding textual annotation details, and wherein the second annotation group includes a second group of annotations at least some of which have one or more corresponding textual annotation details; an input device to receive a user input to select one of the first annotation group or the second annotation group; and means for displaying the one or more corresponding textual annotation details of the first group of annotations for the first annotation group and visual representations of the second group of annotations for the second annotation group without displaying the one or more corresponding textual annotation details of the second group of annotations.

In one example, a method includes: displaying a first group of objects and a second group of objects; displaying first corresponding information of at least one of the first group of objects; displaying second corresponding information of at least one of the second group of objects; receiving, by a computing device, user input to select one of the first group of objects or the second group of objects; upon receiving the user input, displaying a quantity of the first corresponding information of the at least one of the first group of objects; upon receiving the user input, displaying a quantity of the second corresponding information of the at least one of the second group of objects, wherein the first quantity is not equal to the second quantity.

DETAILED DESCRIPTION

In general, the present disclosure is directed to techniques for intelligently displaying, e.g., events of multiple calendars or annotations in a word processor in a single view of an application. In one example, a calendar application may allow a user to display multiple calendars in a single calendar view via a touch-sensitive screen. For example, a calendar application may allow a user to display a work calendar and a personal calendar in the same calendar view. Each calendar may include associated calendar events, e.g., meetings and appointments. The events of each calendar may be identified by a visual characteristic, e.g., color or visual pattern. For example, events of a personal calendar may be colored green, while events of a work calendar may be colored red. Increasing the number of calendars displayed in a single calendar view may increase the number of calendar events displayed. If many calendars are displayed in a single calendar view, the number of calendar events displayed may create unacceptable levels of visual congestion and/or increase the level of effort required by the user to identify particular events of interest.

In another example, a word processing application may display word processing content that a user may edit. In some examples, a word processing application may automatically associate annotations with word processing content when changes are made. In other examples, users may enter annotations manually to comment on word processing content. If many annotations are displayed in a single view, the number of annotations displayed may create unacceptable levels of visual congestion and/or increase the level of effort required by the user to identify a particular annotation.

In certain aspects of the disclosure, a calendar application may cause, e.g., two or more calendars to be displayed in a calendar view. Each calendar may include calendar events (e.g., meetings or appointments). Furthermore, each calendar event may include textual event details about the event, e.g., date, time, location, invitees, etc. The calendar application may display textual event details of calendar events for each calendar in the calendar view via an output device such as a touch-sensitive screen. In some examples, a user may determine that an unacceptable level of visual congestion exists when viewing all details of all calendar events. In such examples, the user may instruct the calendar application to "collapse" calendar events for calendars where full details are unnecessary. Collapsing a calendar event may include displaying a calendar event as a visual representation of a calendar event without textual event details. In other examples, collapsing a calendar event may include displaying only a limited set of event details for calendar events. In one example, calendar events for a particular calendar may be identified by a color code. A colored, vertical bar in a calendar view spanning the hours of 8:00 AM-10:00 AM may therefore indicate a calendar event of a particular calendar. In some examples, a user may collapse calendar events of multiple calendars. In this way, the calendar application may enable the user to display calendar event details for some calendars via an output device, while still providing condensed representations of calendar events for other calendars.

Figure 1:
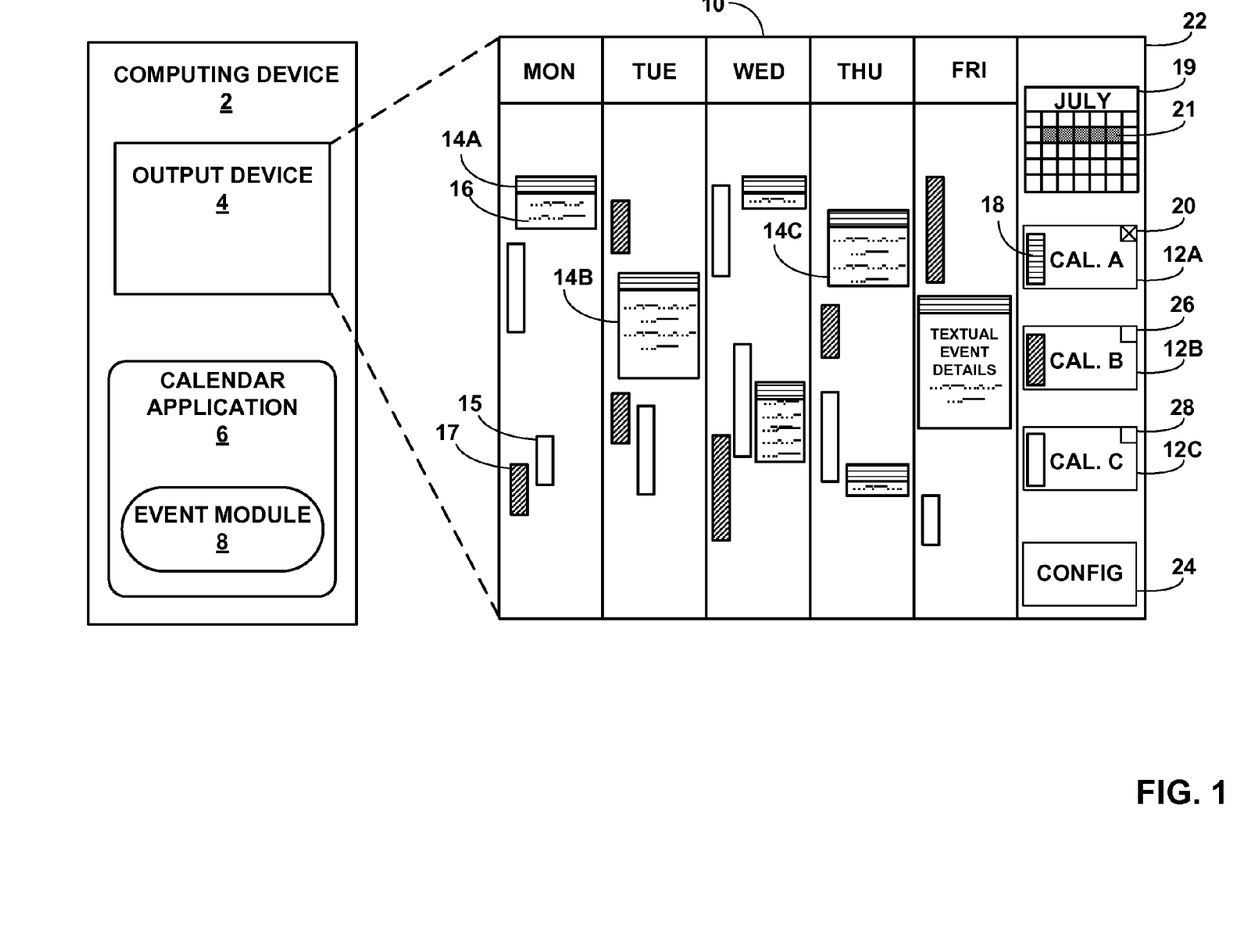
FIG. 1 is a block diagram illustrating an example of a computing device that may be configured to execute one or more applications, including a calendar application, and receive a user input, in accordance with one or more aspects of the present disclosure.

FIG. 1 is a block diagram illustrating an example of a computing device 2 that may be configured to execute one or more applications, including calendar application 6, and receive a user input, in accordance with one or more aspects of the present disclosure. Computing device 2 may, in some examples, include or be a part of a portable computing device (e.g. mobile phone/netbook/laptop/tablet device) or a desktop computer. Computing device 2 may also connect to a network including a wired or wireless network. In some examples, computing device 2 may include an output device 4. Output device 4 is described in further detail in FIG. 2 and may include a touch-sensitive screen, a cathode ray tube (CRT) monitor, liquid crystal display (LCD), or any other type of device that can generate intelligible output to a user.

Computing device 2 may execute a calendar application 6. Calendar application 6 may contain an event module 8 that performs various operations further described in FIG. 2. In some examples, calendar application 6 may display a calendar view 10 via output device 4. FIG. 1 illustrates an expanded view of calendar view 10 as displayed in output device 4. Calendar view 10 may cause one or more calendars A-C (shown in FIG. 1 as CAL. A, CAL. B, CAL. C) to be displayed in output device 4. In some examples, calendar application 6 may be described as displaying events. Those of skill in the art will understand that the calendar application 6 can cause events to be displayed via output device 4 using standard techniques.

A calendar may include a collection of calendar events associated with an entity. An entity may be, e.g., a person, a group of persons, organization, or a shared resource. In some examples, a shared resource may include a conference room or automobile. In the example of FIG. 1, calendar A may be associated with a person, e.g., a user of calendar application 6. Calendar A may further include a group of one or more associated calendar events, e.g., calendar event 14A, 14B, and 14C. Each calendar event associated with a particular calendar is identified by a unique visual property shared by the calendar and the calendar events. In the example of FIG. 1, a horizontal pattern identifies each calendar event, e.g., calendar event 14A, 14B, 14C, associated with calendar A. Other examples of unique visual properties include colors, shadings, patterns and shapes.

Calendar view 10 may display calendars A-C in one or more configurations of a Gregorian calendar. For example, calendar view 10 may display calendars A-C as: a day view (shown in FIG. 6) displaying a range of hours, e.g., 10:00 AM-4:00 PM; a week view displaying the seven days of the Gregorian calendar week; a work week view displaying the days of the Gregorian calendar week but not including Saturday and Sunday (shown in FIG. 1); a month view displaying a Gregorian calendar month; or a year view displaying a Gregorian calendar year.

A calendar displayed in calendar view 10 may include calendar events. A calendar event may represent an event or task that occurs at a particular date and time. Each calendar event may further include a collection of textual event details 16 to identify or describe each calendar event. For example, calendar event 14A may represent a meeting that a user will attend. Calendar event 14A may include multiple textual event details 16, e.g., event title, start time, end time, event duration, location, invitees, and event description. In one example, calendar event 14A may include textual event details 16 such as: Strategy Meeting (event title), 8:00 AM (start time), 9:30 AM (end time), 1.5 hours (duration), Conference Room A (location), Bob and Jill (invitees), and "Bring strategy binders and laptops. Breakfast will be served." (event description). Displaying textual event details 16 may be advantageous to the user because relevant information is displayed to the user immediately in calendar view 10 without requiring additional user input.

Calendar application 6 may further include a control panel 22. Control panel 22 may include calendar identifiers 12A-C for each calendar displayed in calendar view 10. A calendar identifier may include a calendar name, a visual property 18 associated with each calendar event of the calendar, and an event details toggle 20. For example, calendar A is identified in control panel 22 by a calendar identifier 12A that includes the calendar title ("CAL. A"), visual property 18 (a horizontal pattern), and event details toggle 20 (currently selected). Control panel 22 may further include one or more configuration selectors 24 that provide administrative functionality for calendar application 6. Configuration selectors 24 may, for example, enable a user to add or remove calendars in calendar view 10.

Control panel 22 may include a calendar legend 19. Calendar legend 19 may display calendar view 10 in a broader time context. For example, as shown in FIG. 1, calendar legend 19 may display the month that includes the work week presently displayed in calendar view 10. Calendar legend 19 may also include a calendar view indicator 21 that represents the calendar view presently displayed by calendar application 6 via output device 4. Calendar view indicator 21 may enable the user to quickly identify calendar view 10, e.g., a work week, within a broader time context, e.g., a month.

Calendar legend 19 may further enable the user to change time/date range displayed in calendar view 10. For example, the user may provide a user input that selects, using calendar legend 19, a different work week to be displayed in calendar view 10. In response to the user input, calendar view 10 may display the work week selected by the user. In other examples, the user may use calendar legend 19 to change the time dimension of calendar view 10 from, e.g., a week to a month.

Calendar application 6 may display calendar events via output device 4 in a variety of configurations. For example, calendar application 6 may cause textual event details of each calendar event associated with a particular calendar to be displayed in output device 4. Alternatively, calendar application 6 may, for a particular calendar, display visual representations of each associated calendar event via output device 4 without textual event details. In FIG. 1, calendar events of calendars B and C, e.g., calendar events 15 and 17, are displayed by output device 4 as visual representations of calendar events without textual event details. A visual representation of a calendar event may include, e.g., a vertical bar with a length approximately equal to the duration of the calendar event. More generally, a visual representation of a calendar event may indicate to the user that an event is scheduled at a particular date and time. A visual representation of a calendar event may include a vertical bar, shading, or any other graphical indicator capable of displaying to a user that the presence of a calendar event.

In some examples, calendar application 6 may concurrently display, via output device 4, textual event details of calendar events for a first calendar while displaying calendar events as visual representations without textual event details for a second calendar. For example, in FIG. 1 calendar application 6 causes textual event details of calendar events for calendar A to be displayed in output device 4. Calendar application 6 concurrently displays calendar events of calendars B and C via output device 4 as visual representations without textual event details. Using the techniques of the present disclosure, a user may, according to his or her preferences, select which calendars will display textual event details of calendar events and which calendars will display calendar events as visual representations without textual event details.

In some examples, a user may increase the number of calendars displayed in calendar view 10 by output device 4. Increasing the number of calendars displayed may result in a corresponding increase in the number calendar events displayed in the calendar view. If a large number of calendar events are displayed and the textual event details of each calendar event are displayed, the user may experience an unacceptable level of visual congestion and/or increased difficulty identifying particular events of interest. Aspects of the present disclosure overcome these limitations.

In FIG. 1, a user may wish to view textual event details of calendar events for calendar A while viewing only visual representations of calendar events without textual event details for calendars B and C. Initially, calendar application 6 displays textual event details of each calendar event associated with calendars A-C via output device 4. When textual event details are displayed for a particular calendar, the event details toggle, e.g., event details toggle 20, may be set to a selected state. To change the display of calendar events for calendars B and C, the user may provide a user input. The user input may cause calendar application 6 to display visual representations of calendar events without textual event details for calendars B and C via output device 4. A user input may include a keystroke, touch gesture, or other input provided by the user and interpretable by computing device 2. Upon receiving a user input to display visual representations of calendar events without textual event details for calendars B and C, calendar application 6 may "collapse" calendar events of calendars B and C. Collapsing calendar events of a calendar may include displaying visual representations of calendar events without textual event details. When visual representations of calendar events without textual event details are displayed, the event details toggle, e.g., event details toggle 26, is set to an unselected state.

In one exemplary use case of FIG. 1, a user may initially add calendars A-C to calendar view 10 using configuration selector 24. Calendar A may be the user's work calendar, calendar B may be the user's personal calendar, and calendar C may be the personal calendar of the user's spouse. Initially, textual event details of each calendar event for each calendar may be displayed in the calendar view. The user may, however, determine that the level of visual congestion generated by the display of all textual event details for all calendar events is unacceptable. In the exemplary use case, the user may only require textual event details of calendar events for the work calendar, i.e., calendar A. The user may, however, still wish to display visual representations of calendar events for the user's personal calendar and the spouse's calendar, rather than removing the calendars entirely from the calendar view. To collapse calendar events of calendars B and C, the user may provide a user input that causes calendar application 6 to display via output device 4 visual representations of calendar events without textual event details for calendars B and C.

After calendars B and C have been collapsed, event details toggles 26 and 28 may be displayed as deselected. At a later time, the user may wish to view the textual event details of calendar events for calendar B. The user may provide a subsequent user input that causes calendar application 6 to display textual event details of calendar events via output device 4 for calendar B, i.e., calendar application 6 "expands" calendar events of calendar B.

Calendar application 6 may expand and collapse calendar events in response to various user inputs. In one example, output device 4 may be a touch-sensitive screen. To generate a user input, a user may perform a touch gesture on the area of output device 4 that displays an expanded calendar event, e.g., calendar event 14A. A touch gesture may include a single tap, double tap, long press or other touch gesture. The touch gesture generates a user input that causes calendar application 6 to collapse all calendar events associated calendar A. Similarly, a touch gesture performed on the area of output device 4 that displays a collapsed calendar event, e.g., calendar event 14B associated with calendar B, may cause calendar application 6 to expand all calendar events associated with calendar B.

In other examples, a user may perform a touch gesture on the area of output device 4 that displays an event details toggle to expand or collapse calendar events. For example, a user may perform a touch gesture on the area of output device 4 that displays event details toggle 20. Performing a touch gesture on event details toggle 20 may select event details toggle 20 and expand calendar events of calendar A. Performing a subsequent touch gesture on the area of output device 4 that displays event details toggle 20 may collapse events of calendar and deselect event details toggle 20. In other examples, a user may collapse and expand calendar events using a computer pointing device, such as a mouse. In such examples, user inputs are provided through a computer pointing device, such as a mouse, rather than through touch gestures.

Various aspects of the disclosure may provide, in certain instances, one or more benefits and advantages. For example, if a viewer determines that the number of calendar events generated for display by the calendar application creates an unacceptable level of visual congestion or increases the level of effort required to identify particular events of interest, the user may collapse calendar events when textual event details are unnecessary. By collapsing calendar events where textual event details are unnecessary, more textual event details may be shown for each remaining calendar event that is not collapsed.

Other various aspects of the disclosure may provide, in certain instances, one or more benefits and advantages. For example, collapsing one or more calendars may result in fewer textual event details displayed to a user, and therefore the user may exert less effort when searching for a particular calendar event. In some examples, selectively collapsing one group of calendar events while displaying textual event details of other groups of calendar events also provides the user with greater customization. This customization may be particularly beneficial because a user is not required to collapse all events for all calendars or display all textual event details for all calendar events. Thus, a user may benefit from viewing only relevant textual event details while retaining the ability to view visual representations of calendar events from other calendars. Collapsing rather than entirely removing a calendar may provide a further benefit when a user wishes to identify conflicts in a calendar view without display all details of all calendar events.

Figure 2:
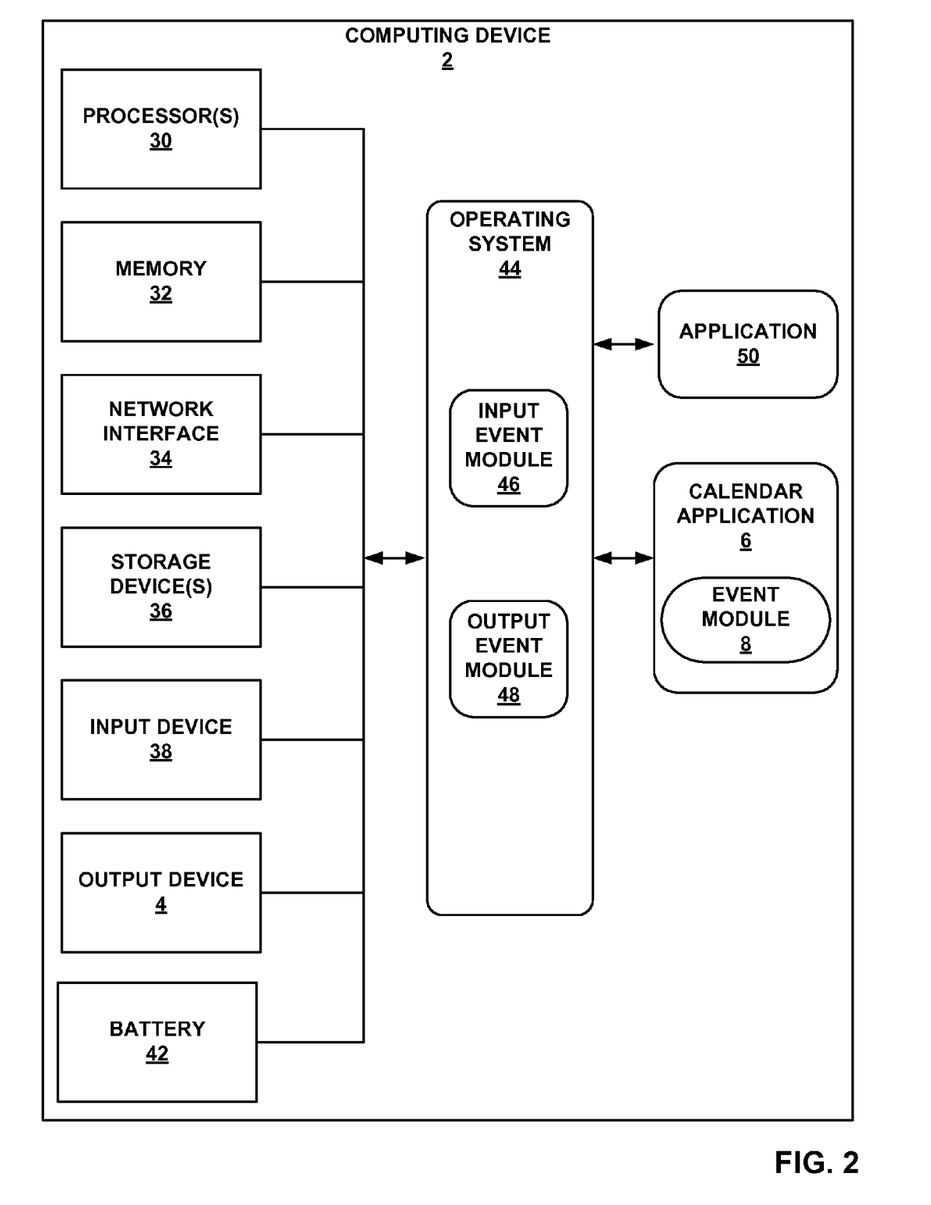
FIG. 2 is a block diagram illustrating further details of one example of the computing device shown in FIG. 1, in accordance with one or more aspects of the present disclosure.

FIG. 2 is a block diagram illustrating further details of one example of computing device 2 shown in FIG. 1, in accordance with one or more aspects of the present disclosure. FIG. 2 illustrates only one particular example of computing device 2, and many other example embodiments of computing device 2 may be used in other instances.

As shown in the specific example of FIG. 2, computing device 2 includes one or more processors 30, memory 32, a network interface 34, one or more storage devices 36, input device 38, output device 4, and battery 42. Computing device 2 also includes an operating system 44, input event module 46, and output event module 48, which may include modules that are executable by computing device 2. Computing device 2 may further include one or more applications 50 and a calendar application 6. One or more applications 50 and calendar application 6 are also executable by computing device 2. Each of components 30, 32, 34, 36, 38, 4, 42, 44, 46, 48, 50, and 6 may be interconnected (physically, communicatively, and/or operatively) for inter-component communications.

Processors 30 may be configured to implement functionality and/or process instructions for execution within computing device 2. Processors 30 may be capable of processing instructions stored in memory 32 or instructions stored on storage devices 36.

Memory 32 may be configured to store information within computing device 2 during operation. Memory 32 may, in some examples, be described as a computer-readable storage medium. In some examples, memory 32 is a temporary memory, meaning that a primary purpose of memory 32 is not long-term storage. Memory 32 may also, in some examples, be described as a volatile memory, meaning that memory 32 does not maintain stored contents when the computer is turned off. Examples of volatile memories include random access memories (RAM), dynamic random access memories (DRAM), static random access memories (SRAM), and other forms of volatile memories known in the art. In some examples, memory 32 may be used to store program instructions for execution by processors 30. Memory 32 may be used by software or applications running on computing device 2 (e.g., one or more of applications 50) to temporarily store information during program execution.

Storage devices 36 may also include one or more computer-readable storage media. Storage devices 36 may be configured to store larger amounts of information than memory 32. Storage devices 36 may further be configured for long-term storage of information. In some examples, storage devices 36 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 2 also includes a network interface 34. Computing device 2 may utilize network interface 34 to communicate with external devices via one or more networks, such as one or more wireless networks. Network interface 34 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, computing device 2 may utilize network interface 34 to wirelessly communicate with an external device (not shown) such as a server, mobile phone, or other networked computing device.

Computing device 2 may also include one or more input devices 38. Input device 38 may be configured to receive input from a user through tactile, audio, or video feedback. Examples of input device 38 may include a touch-sensitive screen, mouse, a keyboard, a voice responsive system, or any other type of device for detecting a command from a user. In some examples, input device 38 may include a touch-sensitive screen (e.g., touch-sensitive screen 4), mouse, keyboard, microphone or video camera.

One or more output devices 4 may also be included in computing device 2. Output device 4 (also shown as output device 4 in FIG. 1) may be configured to provide output to a user using tactile, audio, or video stimuli. Output device 4 may include a touch-sensitive screen, sound card, a video graphics adapter card, or any other type of device for converting a signal into an appropriate form understandable to humans or machines. Additional examples of output device 4 may include a speaker, a cathode ray tube (CRT) monitor, a liquid crystal display (LCD), or any other type of device that can generate intelligible output to a user.

Computing device 2 may include one or more batteries 42, which may be rechargeable and provide power to computing device 2. Battery 42 may be made from nickel-cadmium, lithium-ion, or other suitable material.

Computing device 2 may include operating system 44. Operating system 44 may control the operation of components of computing device 2. For example, operating system 44 may facilitate the interaction of application 50 or calendar application 6 with processors 30, memory 32, network interface 34, storage device 36, input device 38, output device 4, and battery 42. Examples of operating system 44 include Android®, Apple iOS®, Blackberry® OS, Symbian OS®, Linux®, and Microsoft Windows Phone 7®.

Operating system 44 may additionally include an input event module 46 and an output event module 48. Input event module 46 and output event module 48 may be executed as part of operating system 44. In other cases, input event module 46 and output event module 48 may be implemented or executed by computing device 2. Input event module 46 may process input, e.g., touch input received from user 22, through input device 38. Alternatively, input event module 46 may receive input from a component such as processors 30, memory 32, network interface 34, storage devices 36, output device 4, battery 42, or operating system 44. In some cases, input event module 46 may perform additional processing on the input. In other cases, input event module 46 may transmit the input to an application, e.g. application 50 or 52 or calendar application 6, or other component in computing device 2.

Output event module 48, may in some cases, receive an output from application 50, calendar application 6, operating system 44, or other component in computing device 2. In some cases, output event module 48 may perform additional processing on the output. In other cases, output event module 48 may send the output to a component in computing device 2. A component may be, e.g., processors 30, memory 32, network interface 34, storage devices 36, input device 38, output device 4, or battery 42.

Computing device 2 may further include calendar application 6. Calendar application 6 may include, e.g., calendar application 6 as shown in FIG. 1. Calendar application 6 may further include an event module 8. Event module 8 may include instructions that cause calendar application 6 executing on computing device 2 to perform the operations and actions described in FIG. 1-8. For example, in response to a user input received from input device 38 and/or output device 4 (e.g., a touch-sensitive screen), event module 8 may cause calendar application 6 executing on computing device 2 to collapse one or more calendar events.

In another example, in response to a user input received from input device 38 and/or output device 4 (e.g., a touch-sensitive screen), event module 8 may cause calendar application 6 executing on computing device 2 to expand one or more calendar events. More generally, event module 8 may cause calendar application 6 to change the calendar view (e.g., calendar view 10 as shown in FIG. 1) in response to a user input received from input device 38 and/or output device 4 (e.g., a touch-sensitive screen). Changing the calendar view may include expanding or collapsing calendar events.

Any applications, e.g. application 50 or calendar application 6, implemented within or executed by computing device 2 may be implemented or contained within, operable by, executed by, and/or be operatively/communicatively coupled to components of computing device 2, e.g., processors 30, memory 32, network interface 34, and/or storage devices 36.

Figure 3:
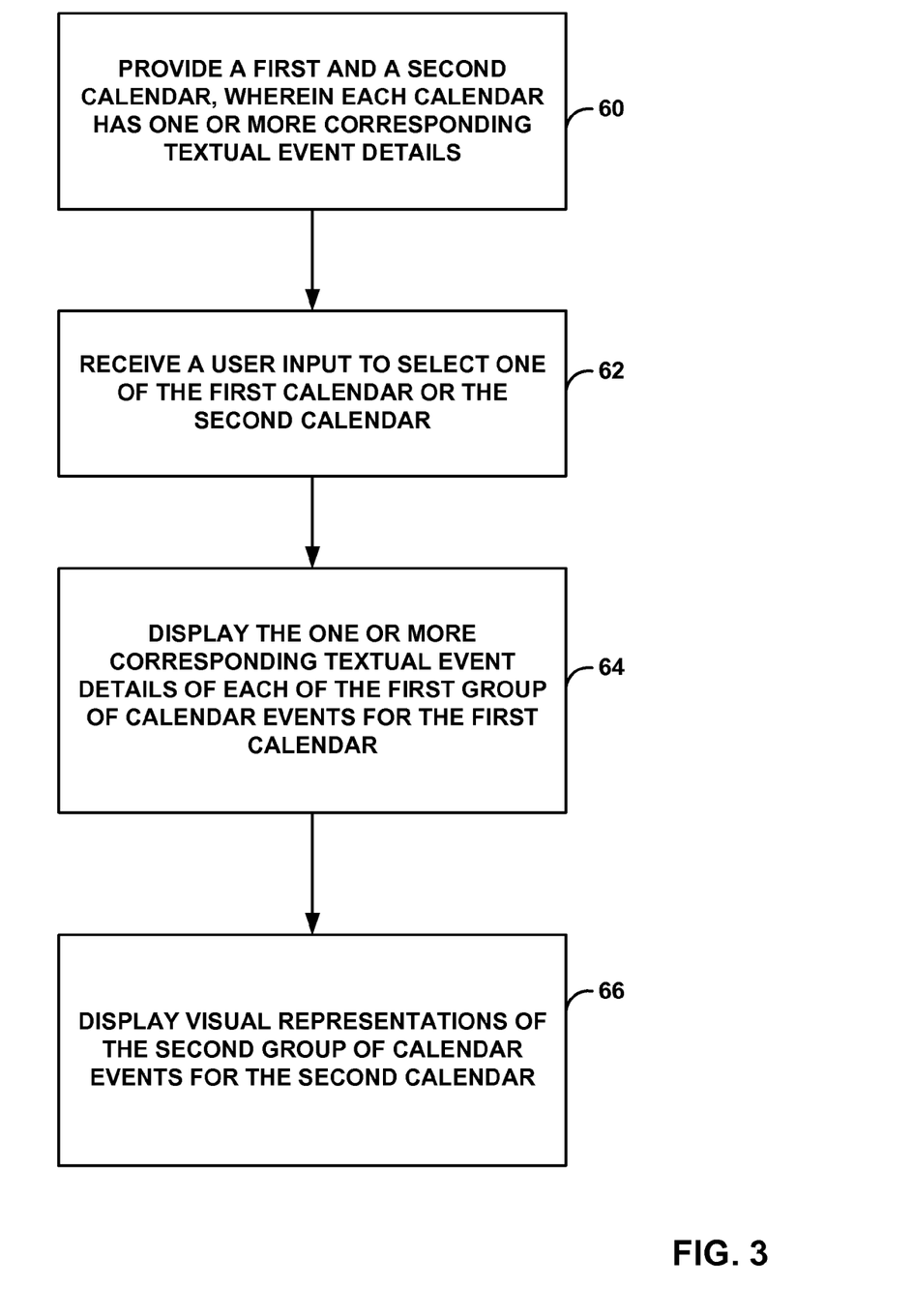
FIG. 3 is a flow diagram illustrating an example method that may be performed by a computing device to display textual event details of calendar events and visual representations of calendar events, in accordance with one or more aspects of the present disclosure.

FIG. 3 is a flow diagram illustrating an example method that may be performed by a computing device to display textual event details of calendar events and visual representations of calendar events. For example, the method illustrated in FIG. 3 may be performed by computing device 2 shown in FIGS. 1 and/or 2.

The method of FIG. 3 includes providing a first calendar and a second calendar during execution of a module on a computing device, wherein the first calendar includes a first group of calendar events at least some of which have one or more corresponding textual event details, and wherein the second calendar includes a second group of calendar events at least some of which have one or more corresponding textual event details (60). The method further includes receiving a user input to select one of the first calendar or the second calendar (62). The method further includes, upon receiving the user input, displaying the one or more corresponding textual event details of each of the first group of calendar events for the first calendar (64). The method further includes, upon receiving the user input, displaying visual representations of the second group of calendar events for the second calendar without displaying the one or more corresponding textual event details of each of the second group of calendar events (66).

In some examples, the module is a part of a calendar application executing on the computing device. In some examples, the module is part of an operating system executing on the computing device. In some examples, the method includes, wherein receiving the user input includes receiving the user input to select the first calendar, wherein displaying the one or more corresponding textual event details of the first group of calendar events for the first calendar includes displaying the one or more corresponding textual event details of the first group of calendar events responsive to selection of the first calendar, and wherein displaying the visual representations of the second group of calendar events for the second calendar includes maintaining a display of the visual representations of the second group of calendar events for the second calendar without displaying the one or more corresponding textual event details of the second group of calendar events.

In some examples, the method includes wherein receiving the user input includes receiving the user input to select the second calendar, wherein displaying the one or more corresponding textual event details of the first group of calendar events for the first calendar includes maintaining a display of the one or more corresponding textual event details of the first group of calendar events for the first calendar, and wherein displaying the visual representations of the second group of calendar events for the second calendar includes displaying the visual representations of the second group of calendar events for the second calendar responsive to selection of the second calendar. In some examples, the method includes receiving a second user input to select a calendar event in the second group of calendar events; and responsive to receiving the second user input, displaying one or more textual event details corresponding to the selected calendar event in the second group of calendar events. In some examples, the method further includes receiving a second user input to select a calendar event in a second group of calendar events; and responsive to receiving the second user input, displaying visual representations of the second group of calendar events for the first calendar without displaying the one or more corresponding textual event details of the first group of calendar events.

In some examples, the method includes receiving a second user input to select a calendar event in the second group of calendar events; and responsive to receiving the second user input, displaying the one or more corresponding textual event details of the second group of calendar events for the second calendar. In some examples, the method includes receiving a second user input to select a control in a control panel of the calendar application; and responsive to receiving the second user input, displaying the one or more corresponding textual event details of the second group of calendar events for the second calendar. In some examples, the method includes receiving a second user input to select a control in a control panel of the calendar application; and responsive to receiving the second user input, displaying visual representations of the first group of calendar events for the first calendar without displaying the one or more corresponding textual event details of each of the first group of calendar events.

In some examples, the one or more corresponding textual event details of each of the first group of calendar events and of each of the second group of calendar events include one or more persons or resources, a time, a date, or a location, or any combination thereof. In some examples the first group of calendar events is identified by a first unique visual property and the second group of calendar events is identified by a second unique visual property. In some examples, the first unique visual property and the second unique visual property are each a different color, shading, or other visual characteristic. In some examples, the method further includes providing a third calendar during execution of the calendar application, wherein the third calendar includes a third group of calendar events at least some of which have one or more corresponding textual event details; receiving a user input to select one of the first calendar, the second calendar, or the third calendar; and responsive to receiving the second user input to select the third calendar, displaying visual representations of the third group of calendar events for the third calendar without displaying the one or more corresponding textual event details of the third group of calendar events. In some examples, the module comprises an event module, and wherein the event module changes a calendar view in response to the user input.

In one example a method includes: displaying a first group of objects and a second group of objects; displaying first corresponding information of at least one of the first group of objects; displaying second corresponding information of at least one of the second group of objects; receiving, by a computing device, user input to select one of the first group of objects or the second group of objects; upon receiving the user input, displaying a quantity of the first corresponding information of the at least one of the first group of objects; upon receiving the user input, displaying a quantity of the second corresponding information of the at least one of the second group of objects, wherein the first quantity is not equal to the second quantity.

In some examples, the first group of objects comprises a first calendar, the first calendar including a first group of calendar events; and wherein the second group of objects comprises a second calendar, the second calendar including a second group of calendar events. In some examples, the first group of objects comprises a first annotation group, the first annotation group including one or more first annotations; and wherein the second group of objects comprises a second annotation group, the second annotation group including one or more second annotations. In some examples, the method further includes displaying visual representations of the at least one of the first group of objects when the first quantity of the first corresponding information is equal to zero. In some examples, the method further includes displaying visual representations of the at least one of the second group of objects when the second quantity of the first corresponding information is equal to zero.

Figure 4:
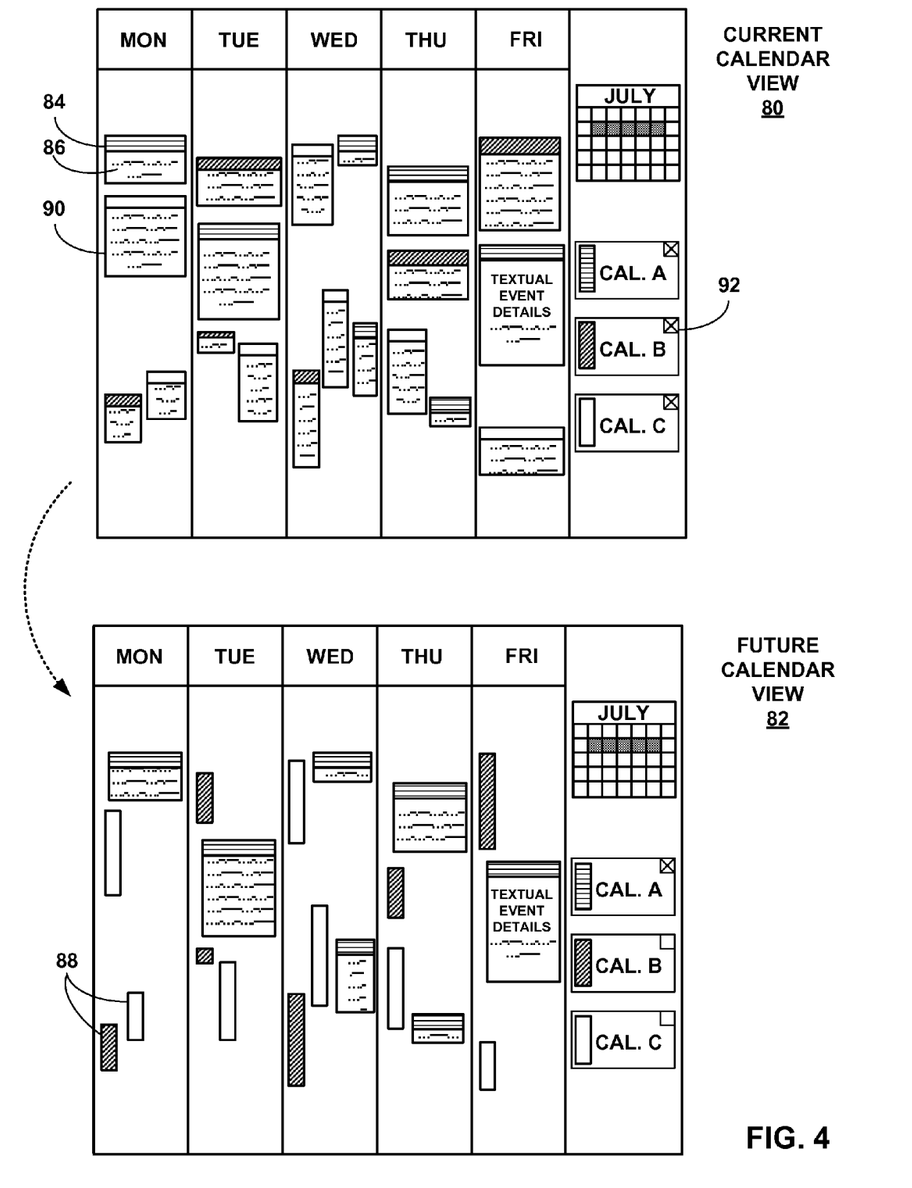
FIG. 4 is a block diagram illustrating an example of a calendar view initially configured to display textual event details of each calendar event for each calendar, and after receiving one or more user inputs, displaying visual representations of calendar events for one or more calendars, in accordance with one or more aspects of the present disclosure.

FIG. 4 is a block diagram illustrating an example of a calendar view initially configured to display textual event details of each calendar event for each calendar, and after receiving one or more user inputs, displaying visual representations of calendar events for one or more calendars, in accordance with one or more aspects of the present disclosure. Elements of FIG. 4, previously disclosed in FIG. 1, include the same characteristics as described in FIG. 1 unless otherwise described hereinafter. FIG. 4 includes a current calendar view 80 and a future calendar view 82. Each calendar view is displayed via an output device by a calendar application executing on a computing device, for example, calendar application 6 and computing device 2 of FIG. 1. Current time view 80 and future time view 82 each display one or more calendars similar to calendar view 10 as shown in FIG. 1.

In current calendar view 80, a user may determine that the number of calendar events 84, each displaying textual event details, has created an unacceptable level of visual congestion. Alternatively, the user may determine that the level of effort required to identify particular events of interest has increased to an undesirable level. In either case, the user may generate a user input, e.g., by performing one or more touch gestures, which collapse calendars events of calendars B and C. For example, the user may single tap event details toggle 92 to collapse all calendar events associated with calendar B.

Additionally, the user may double tap calendar event 90 to collapse calendar all events associated with calendar C.

In response to the user inputs, the calendar application displays via an output device representations of calendar events without textual event details 88 for calendars B and C in future calendar view 82. Future calendar view 82 illustrates the benefit of a less visually congested calendar view that may enable a user to more quickly identify calendar events of interest. Furthermore, displaying fewer calendar events while still displaying representations of calendar events for calendars B and C enables the user to identify potential calendar event conflicts.

Figure 5:
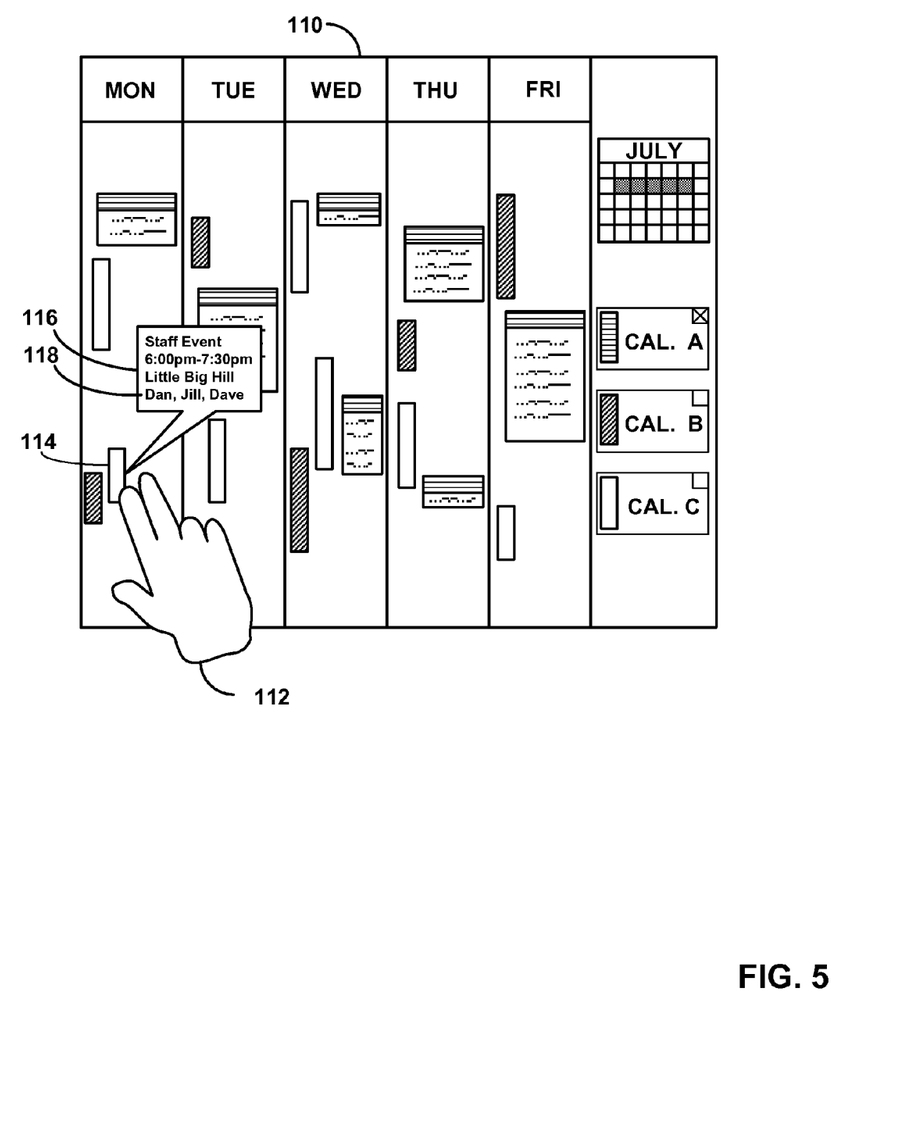
FIG. 5 is a block diagram illustrating an example of a calendar application displaying textual event details for a single calendar event, in accordance with one or more aspects of the present disclosure.

FIG. 5 is a block diagram illustrating an example of a calendar application displaying textual event details for a single calendar event, in accordance with one or more aspects of the present disclosure. Elements of FIG. 5, previously disclosed in FIG. 1, include the same characteristics as described in FIG. 1 unless otherwise described hereinafter. FIG. 5 includes a calendar view 110 displayed by a calendar application (e.g., calendar application 6 of FIG. 1) via an output device that may further include calendars A, B, and C. In some examples, a user 112 may wish to quickly view textual event details 118 of a single collapsed calendar event, e.g., a visual representation of calendar event 114 of calendar C. User 112 may further wish to view textual event details 118 of calendar event 114 without expanding all other calendar events of calendar C. In some examples, user 112 may generate a user input, e.g., by performing a touch gesture, which causes the calendar application to display textual event details 118 of calendar event 114 via an output device.

In one example use case, user 112 may wish to view textual event details 118 of calendar event 114 without expanding all other calendar events of calendar C. User 112 may perform a touch gesture, e.g., a double-tap, on the area of the output device that displays the visual representation of calendar event 114. In some examples, the calendar application may display textual event details 118 of calendar event 114 as balloon text 116 via an output device. In other examples, the calendar application may display textual event details in an expanded calendar event, e.g., calendar event 14A (as shown in FIG. 1). After viewing the textual event details, user 112 may generate a subsequent user input, e.g., by performing a touch gesture, that causes the calendar application to terminate balloon text 116. In this way, the user may quickly view calendar details of a single calendar event without substantially increasing visual congestion in calendar view 110.

Figure 6:
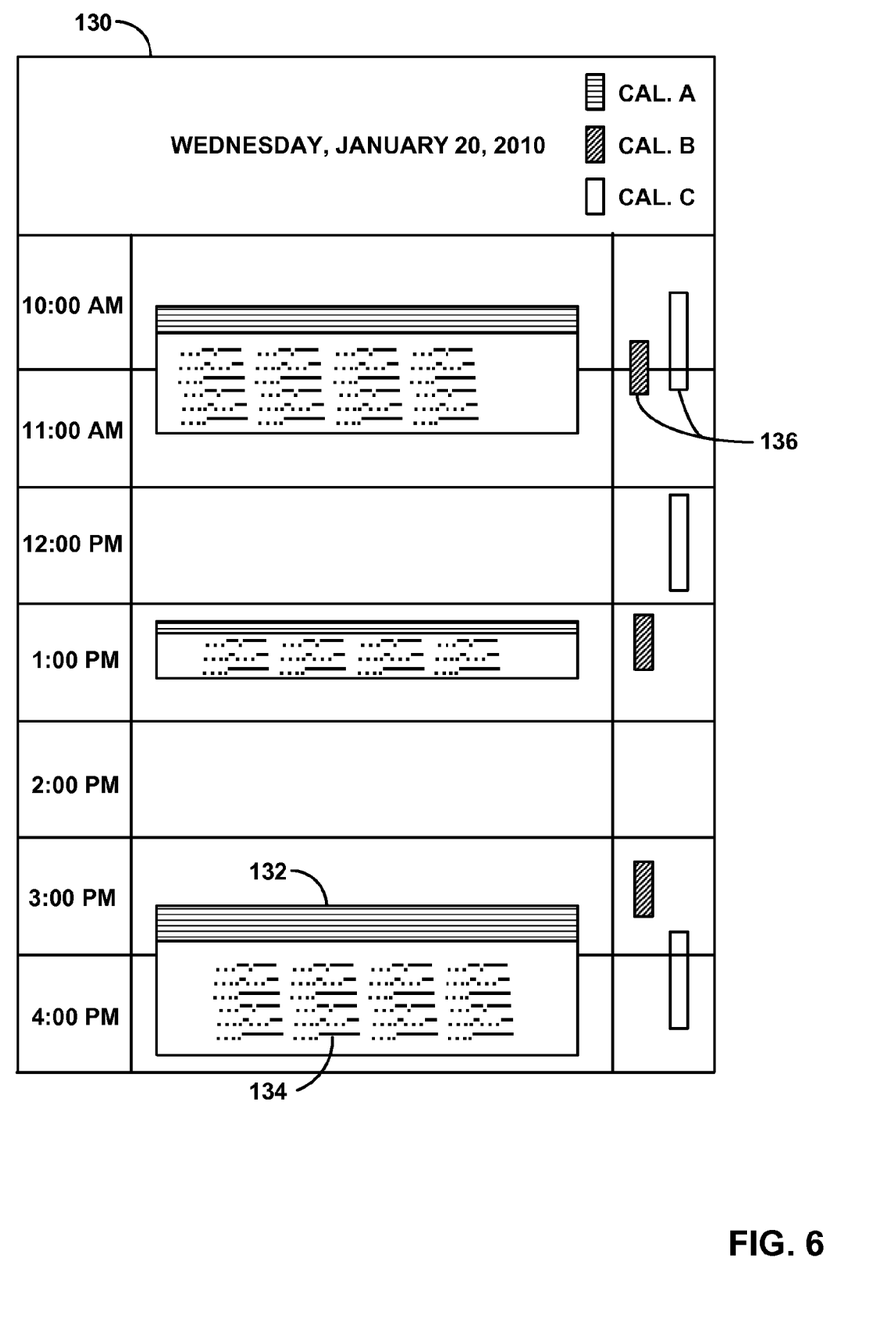
FIG. 6 is a block diagram illustrating an example of a calendar application displaying calendar events in a day calendar view, in accordance with one or more aspects of the present disclosure.

FIG. 6 is a block diagram illustrating an example of a calendar application displaying calendar events in a day calendar view, in accordance with one or more aspects of the present disclosure. Elements of FIG. 6, previously disclosed in FIG. 1, include the same characteristics as described in FIG. 1 unless otherwise described hereinafter. In some examples, a user may wish to view calendar events in a day calendar view 130 displayed by a calendar application via an output device. In such examples, day calendar view 130 may display textual event details 134 for calendar events, e.g., calendar event 132 of calendar A. Additionally, the calendar application may cause visual representations of calendar events to be displayed 136 without textual event details. A user may perform similar actions, and the calendar application may perform similar operations in FIG. 6 as described in FIG. 1, e.g., expand and collapse calendar events.

Figure 7:
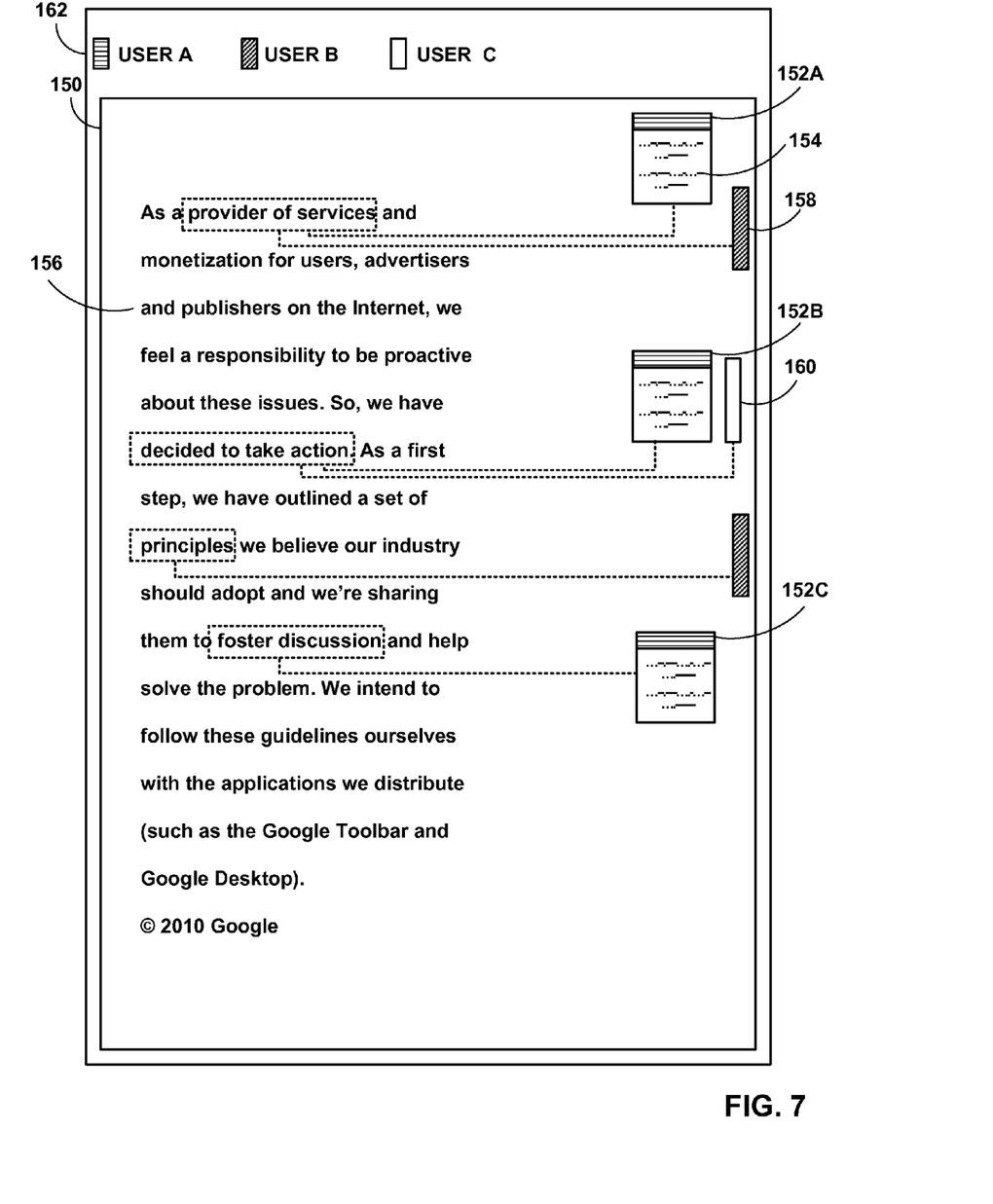
FIG. 7 is a block diagram illustrating an example of a word processor that displays annotations, in accordance with one or more aspects of the present disclosure.

FIG. 7 is a block diagram illustrating an example of a word processor that displays annotations, in accordance with one or more aspects of the present disclosure. Aspects of the present disclosure may be generally adapted to various applications, e.g., a word processing application or a spreadsheet application. FIG. 7 illustrates a word processor 150, displayed in an application view 162 that may execute on a computing device (e.g., computing device 2 shown in FIG. 1). Word processor 150 may cause word processing content 156 that is created and/or edited by one or more users to be displayed via an output device. Application view 162 may display the contents of any application, e.g, word processor 150 or a spreadsheet. Application view 162 may change in response to a user input, e.g., collapsing or expanding annotations.

In some examples, word processor 150 may include one or more annotation groups. An annotation group may include one or more annotations, e.g., 152A, 152B, 152C and may be associated with an entity such as a user, e.g., User A. An annotation, e.g., 152A, 152B, 152C, 158, or 160, may include textual annotation details, e.g., 154. Textual annotation details 154 may include text, images, or other content.

In some examples, multiple users may edit word processing content 156 using word processor 150. A first user, e.g., User A, may add, edit, or delete word processing content 156. A second user, e.g., User B, may also edit, format, or delete word processing content 156. Word processor 150 may individually track and display the edits of each user as annotations. Moreover, word processor 150 may enable each user to add comments to word processing content 156 and display such comments as annotations, e.g., 152A. A comment may include, e.g., a user's written impressions of a particular aspect of word processing content 156. Annotations may beneficially enable users to quickly review edits made to word processing content 156. Furthermore, annotations in word processor 150 may beneficially enable users to share ideas about word processing content 156 and track each idea with each particular user.

In some examples, many users may edit word processing content and therefore many annotation groups may be displayed in the word processor. Increasing the number of annotation groups displayed may result in a corresponding increase in the number annotations displayed in the word processor. If a large number of annotations are displayed and the textual annotation details of each annotation are also displayed, the user may experience an unacceptable level of visual congestion and/or increased difficulty identifying a particular annotation of interest. Aspects of the present disclosure overcome these limitations.

In FIG. 7, a user, e.g., User B, may wish to view textual annotation details 154 of annotations associated with User A. However, User B may not wish to view textual annotation details of annotations associated Users B and C. User B may, however, still wish to view visual representations of the annotations for annotation groups B and C without displaying the one or more corresponding textual annotation details. For example, this approach may be beneficial when User B is only interested in reading comments of User A, but may still wish to see if other users have commented on the same portion of word processing content 156. To collapse annotations of annotation groups associated with User B and User C, a user may provide one or more user inputs similar to the example of FIG. 1. For example, a user may double-tap an annotation associated with User B to collapse all annotations in the annotation group associated with User B. Collapsing annotations associated with User B displays visual representations of the annotations for the annotation group associated with Calendar B without displaying the corresponding one or more corresponding textual annotation details.

Figure 8:
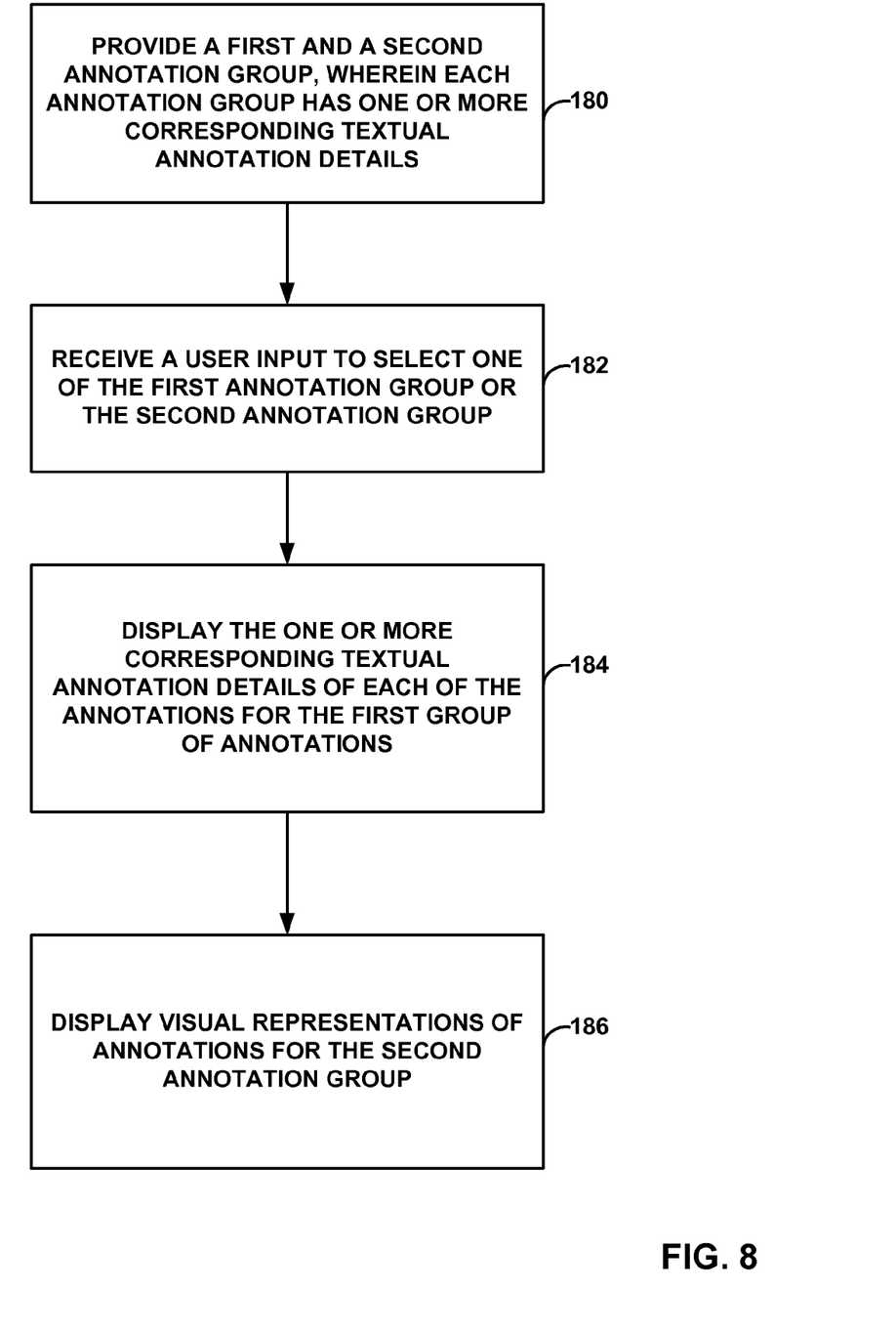
FIG. 8 is a flow diagram illustrating an example method that may be performed by a computing device to display textual annotation details of one or more annotations and visual representations of annotations.

FIG. 8 is a flow diagram illustrating an example method that may be performed by a computing device to display textual annotation details of one or more annotations and visual representations of annotations. For example, the method illustrated in FIG. 3 may be performed by computing device 2 shown in FIGS. 1 and/or 2.

The method of FIG. 8 includes providing a first annotation group and a second annotation group during execution of a module on a computing device, wherein the first annotation group includes annotations at least some of which have one or more corresponding textual annotation details, and wherein the second annotation group includes annotations at least some of which have one or more corresponding textual annotation details (180). The method further includes receiving a user input to select one of the first annotation group or the second annotation group (182). The method further includes upon receiving the user input, displaying the one or more corresponding textual annotation details of the annotations for the first annotation group (184). The method further includes upon receiving the user input, displaying visual representations of the annotations for the second annotation group without displaying the one or more corresponding textual annotation details of the annotations of the second annotation group (186). In some examples, the module is a part of an application executing on the computing device. In some examples, the module includes an event module, wherein the event module changes an application view of the computing device in response to the user input. In some examples, a module is part of an operating system executing on the computing device.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

The invention claimed is:

1. A method comprising:
providing a first calendar and a second calendar during execution of a module on a computing device, wherein the first calendar includes a first group of calendar events at least some of which have one or more corresponding textual event details, and wherein the second calendar includes a second group of calendar events at least some of which have one or more corresponding textual event details;
receiving a user input to select the second calendar;
upon receiving the user input, displaying the one or more corresponding textual event details of the first group of calendar events for the first calendar, wherein displaying the one or more corresponding textual event details of the first group of calendar events for the first calendar comprises maintaining a display of the one or more corresponding textual event details of the first group of calendar events for the first calendar; and
upon receiving the user input, displaying visual representations of the second group of calendar events for the second calendar without displaying the one or more corresponding textual event details of the second group of calendar events.

2. The method of claim 1, wherein the module is a part of a calendar application executing on the computing device.

3. The method of claim 1, wherein the module is a part of an operating system executing on the computing device.

4. The method of claim 1,
wherein receiving the user input comprises receiving the user input to select the first calendar,
wherein displaying the one or more corresponding textual event details of the first group of calendar events for the first calendar comprises displaying the one or more corresponding textual event details of the first group of calendar events responsive to selection of the first calendar, and
wherein displaying the visual representations of the second group of calendar events for the second calendar comprises maintaining a display of the visual representations of the second group of calendar events for the second calendar without displaying the one or more corresponding textual event details of the second group of calendar events.

5. The method of claim 1,
wherein displaying the visual representations of the second group of calendar events for the second calendar comprises displaying the visual representations of the second group of calendar events for the second calendar responsive to selection of the second calendar.

6. The method of claim 1, further comprising:
receiving a second user input to select a calendar event in the second group of calendar events; and
responsive to receiving the second user input, displaying one or more textual event details corresponding to the selected calendar event in the second group of calendar events.

7. The method of claim 1, further comprising:
receiving a second user input to select a calendar event in the first group of calendar events; and
responsive to receiving the second user input, displaying visual representations of the first group of calendar events for the first calendar without displaying the one or more corresponding textual event details of the first group of calendar events.

8. The method of claim 1, further comprising:
receiving a second user input to select a calendar event in the second group of calendar events; and
responsive to receiving the second user input, displaying the one or more corresponding textual event details of the second group of calendar events for the second calendar.

9. The method of claim 1, further comprising:
receiving a second user input to select a control in a control panel of the calendar application; and
responsive to receiving the second user input, displaying the one or more corresponding textual event details of the second group of calendar events for the second calendar.

10. The method of claim 1, further comprising:
receiving a second user input to select a control in a control panel of the calendar application; and
responsive to receiving the second user input, displaying visual representations of the first group of calendar events for the first calendar without displaying the one or more corresponding textual event details of the first group of calendar events.

11. The method of claim 1, wherein the one or more corresponding textual event details of the first group of calendar events and of the second group of calendar events include one or more persons or resources, a time, a date, a location, or any combination thereof.

12. The method of claim 1, wherein the first group of calendar events is identified by a first unique visual property and the second group of calendar events is identified by a second unique visual property.

13. The method of claim 12, wherein the first unique visual property and the second unique visual property are each a different color, shading, or other visual characteristic.

14. The method of claim 1, wherein the module comprises an event module, and wherein the event module changes a calendar view in response to the user input.

15. The method of claim 1, further comprising:
providing a third calendar during execution of the calendar application, wherein the third calendar includes a third group of calendar events at least some of which have one or more corresponding textual event details;
receiving a user input to select one of the first calendar, the second calendar, or the third calendar; and
responsive to receiving the user input to select the third calendar, displaying visual representations of the third group of calendar events for the third calendar without displaying the one or more corresponding textual event details of the third group of calendar events.

16. A non-transitory computer-readable storage medium encoded with instructions that when executed cause one or more processors of a computing device to perform operations comprising:
providing a first calendar and a second calendar during execution of a module, wherein the first calendar includes a first group of calendar events at least some of which have one or more corresponding textual event details, and wherein the second calendar includes a second group of calendar events at least some of which have one or more corresponding textual event details;
receiving a user input to select the second calendar;
upon receiving the user input, displaying the one or more corresponding textual event details of the first group of calendar events for the first calendar, wherein displaying the one or more corresponding textual event details of the first group of calendar events for the first calendar comprises maintaining a display of the one or more corresponding textual event details of the first group of calendar events for the first calendar; and
upon receiving the user input, displaying visual representations of the second group of calendar events for the second calendar without displaying the one or more corresponding textual event details of the second group of calendar events.

17. A computing device, comprising:
one or more processors;
an output device;
a calendar application installed on the computing device and operable by the one or more processors to display at the output device a first calendar and a second calendar during execution of the calendar application, wherein the first calendar includes a first group of calendar events at least some of which have one or more corresponding textual event details, and wherein the second calendar includes a second group of calendar events at least some of which have one or more corresponding textual event details;
an input device to receive a user input to select the second calendar; and
means for displaying:
the one or more corresponding textual event details of the first group of calendar events for the first calendar, wherein displaying the one or more corresponding textual event details of the first group of calendar events for the first calendar comprises maintaining a display of the one or more corresponding textual event details of the first group of calendar events for the first calendar, and
visual representations of the second group of calendar events for the second calendar without displaying the one or more corresponding textual event details of the second group of calendar events.

18. A method comprising:
providing a first annotation group and a second annotation group during execution of a module on a computing device, wherein the first annotation group includes annotations at least some of which have one or more corresponding textual annotation details, and wherein the second annotation group includes annotations at least some of which have one or more corresponding textual annotation details;
receiving a user input to select the second annotation group;
upon receiving the user input, displaying the one or more corresponding textual annotation details of the annotations for the first annotation group, wherein displaying the one or more corresponding textual annotation details of the annotations for the first annotation group comprises maintaining a display of the one or more corresponding textual annotation details of the annotations for the first annotation group; and upon receiving the user input, displaying visual representations of the annotations for the second annotation group without displaying the one or more corresponding textual annotation details of the annotations of the second annotation group.

19. The method of claim 18, wherein the module is a part of an application executing on the computing device.

20. The method of claim 18, wherein the module comprises an event module, and wherein the event module changes an application view of the computing device in response to the user input.

21. The method of claim 18, wherein the module is a part of an operating system executing on the computing device.

22. A non-transitory computer-readable storage medium encoded with instructions that cause one or more processors of a computing device to:

provide a first annotation group and a second annotation group during execution of a module, wherein the first annotation group includes annotations at least some of which have one or more corresponding textual annotation details, and wherein the second annotation group includes annotations at least some of which have one or more corresponding textual annotation details;

receive a user input to select the second annotation group;

upon receiving the user input, display the one or more corresponding textual annotation details of the annotations for the first annotation group, wherein displaying the one or more corresponding textual annotation details of the annotations for the first annotation group comprises maintaining a display of the one or more corresponding textual annotation details of the annotations for the first annotation group; and upon receiving the user input, display visual representations of the annotations for the second annotation group without displaying the one or more corresponding textual annotation details of the annotations of the second annotation group.

23. A computing device, comprising:

one or more processors;

an output device;

an application installed on the computing device and operable by the one or more processors to display at the output device a first annotation group and a second annotation group during execution of the application, wherein the first annotation group includes a first group of annotations at least some of which have one or more corresponding textual annotation details, and wherein the second annotation group includes a second group of annotations at least some of which have one or more corresponding textual annotation details;

an input device to receive a user input to select the second annotation group; and means for displaying;

the one or more corresponding textual annotation details of the first group of annotations for the first annotation group, wherein displaying the one or more corresponding textual annotation details of the annotations for the first annotation group comprises maintaining a display of the one or more corresponding textual annotation details of the annotations for the first annotation group, and visual representations of the second group of annotations for the second annotation group without displaying the one or more corresponding textual annotation details of the second group of annotations.

24. A method comprising:

displaying a first group of objects and a second group of objects;

displaying first corresponding information of at least one of the first group of objects;

displaying second corresponding information of at least one of the second group of objects;

receiving, by a computing device, user input to select the second group of objects;

upon receiving the user input, displaying a quantity of the first corresponding information of the at least one of the first group of objects, wherein displaying the first corresponding information of the at least one of the first group of objects comprises maintaining a display of the first corresponding information of the at least one of the first group of objects;

upon receiving the user input, displaying a quantity of the second corresponding information of the at least one of the second group of objects, wherein the first quantity is not equal to the second quantity.

25. The method of claim 24, wherein the first group of objects comprises a first calendar, the first calendar including a first group of calendar events; and wherein the second group of objects comprises a second calendar, the second calendar including a second group of calendar events.

26. The method of claim 24, wherein the first group of objects comprises a first annotation group, the first annotation group including one or more first annotations; and wherein the second group of objects comprises a second annotation group, the second annotation group including one or more second annotations.

27. The method of claim 24, further comprising:

displaying visual representations of the at least one of the first group of objects when the first quantity of the first corresponding information is equal to zero.

28. The method of claim 24, further comprising:

displaying visual representations of the at least one of the second group of objects when the second quantity of the first corresponding information is equal to zero.

* * * * *